(12) United States Patent
Decroupet et al.

(10) Patent No.: US 8,158,263 B2
(45) Date of Patent: Apr. 17, 2012

(54) LOW EMISSIVITY GLAZING

(75) Inventors: Daniel Decroupet, Jumet (BE); Jean-Michel Depauw, Jumet (BE); Yvan Novis, Jumet (BE)

(73) Assignee: AGC Glass Europe, Brussels (BE)

( * ) Notice: Subject to any disclaimer, the term of this patent is extended or adjusted under 35 U.S.C. 154(b) by 215 days.

(21) Appl. No.: 12/302,539

(22) PCT Filed: May 31, 2007

(86) PCT No.: PCT/EP2007/055333
§ 371 (c)(1),
(2), (4) Date: Nov. 26, 2008

(87) PCT Pub. No.: WO2007/138097
PCT Pub. Date: Dec. 6, 2007

(65) Prior Publication Data
US 2009/0239066 A1    Sep. 24, 2009

(30) Foreign Application Priority Data
May 31, 2006   (EP) .................................... 06114761

(51) Int. Cl.
*B32B 17/06*   (2006.01)
*C23C 14/00*   (2006.01)

(52) U.S. Cl. ........ 428/432; 428/689; 428/697; 428/699; 428/701; 428/702; 204/192.1; 204/192.15; 204/192.26

(58) Field of Classification Search ................. 428/432, 428/689, 697, 699, 701, 702; 204/192.1
See application file for complete search history.

(56) References Cited

U.S. PATENT DOCUMENTS

| | | | |
|---|---|---|---|
| 4,194,022 | A | 3/1980 | Gillery |
| 6,193,856 | B1 | 2/2001 | Kida et al. |
| 2003/0148115 | A1* | 8/2003 | Glenn et al. .................. 428/432 |
| 2003/0170466 | A1 | 9/2003 | Stachowiak |
| 2004/0016202 | A1* | 1/2004 | Hoffman .................... 52/786.13 |
| 2005/0175845 | A1 | 8/2005 | Stachowiak |
| 2006/0099428 | A1 | 5/2006 | Butz et al. |

* cited by examiner

*Primary Examiner* — Gwendolyn Blackwell
(74) *Attorney, Agent, or Firm* — Oblon, Spivak, McClelland, Maier & Neustadt, L.L.P.

(57) ABSTRACT

A low emissivity glazing on a pane of glass, includes a set of thin layers formed by vacuum deposition assisted by magnetron, the set of thin layers including at least one metal layer reflecting infra-red rays between one or more dielectric layers located between the metal layer and the glass sheet, the metal layer being provided with a protective barrier coating, including a layer of titanium oxide or sub-oxide, deposited in a weakly oxidizing atmosphere at reduced pressure via a conducting titanium oxide cathode.

30 Claims, No Drawings

LOW EMISSIVITY GLAZING

CROSS-REFERENCE TO RELATED APPLICATIONS

This application is the entry into the United States of PCT Application number PCT/EP2007/055333 filed May 31, 2007 and claims priority from European application EP06114761.7 filed May 31, 2006, the entirety of each of which is hereby incorporated by reference.

BACKGROUND

The present invention relates to low-emissivity glazing units, i.e. glazing units that have the ability to reflect infrared radiations emitted, for example, by the interior of residences, and therefore restricting heat losses.

The demand for such glazing units is often associated with the requirement to have as high a light transmission as possible. The two requirements of low emissivity and high transmission normally result in opposing solutions in terms of structure. It is necessary to make compromises that are difficult to achieve.

Added to these requirements are those of having glazing units that are as neutral in colour as possible, in particular in reflection. Finally, the production must remain as economical as possible.

To obtain these results, the most usual practice is to have systems of thin layers available having one or several layers that are able to reflect infrared radiations. Systems of this type generally comprise one or more metal layers, in particular silver layers several nanometers thick. The layers must be sufficiently thin so that they do not reduce the visible light transmission too significantly. The thickness must also be sufficient to hinder the transmission of infrared rays, wherein the thickness directly determines the fraction of those effectively reflected.

The systems applied to the glazing units must at the same time meet other conditions. Firstly, it is necessary to ensure that the systems resist any chemical or mechanical attacks they may be exposed to. The metal layers are usually deposited onto the glass substrate using magnetic field-assisted sputtering-type vacuum deposition, commonly known as "magnetron sputtering". The layers obtained by these techniques have the advantage of a high uniformity of composition, thickness and surface condition. However, they are very fragile and must be protected by additional layers. Transparent dielectric layers of metal oxides and/or nitrides and/or oxynitrides or also mixtures thereof that provide the required resistance are most traditionally used.

At the same time, the metal layers must also be protected from any possible diffusion from the substrate that would unfavourably modify the properties of the reflective metal layer. The nature of dielectric layers located between the substrate and the metal layer is often the same as that of layers located above this same metal layer. These concern metal oxides and/or nitrides and/or oxynitrides.

Traditionally, the sequence of layers is configured as follows:

glass/dielectric I/metal/dielectric II wherein each of the dielectrics I and II most frequently comprise several layers of a different nature.

The most frequently used dielectrics are in particular ZnO, $TiO_2$, $SnO_2$, $Si_3N_4$... and their alloys. These dielectric layers provide various optical properties and are also distinguished by their conditions of industrial production.

The most customary structures additionally integrate a special layer between the metal and the outer dielectric, said layer having the function of protecting the metal in particular during deposition of the layer of this dielectric.

In fact, the formation of this dielectric is most often conducted in a so-called "reactive" manner. In this mode of production, the dielectric (oxide or nitride) is formed at the same time as the deposition by metallic vapour emitted by bombardment of a metal cathode with the atmosphere at very low pressure, in which this deposition occurs: an oxygen atmosphere or a gaseous mixture containing oxygen in the case of an oxide. In these conditions, the metal layer deposited is in contact with this atmosphere and can deteriorate in particular because of the high reactivity of the plasma.

To protect against this deterioration, it is customary to arrange a so-called "barrier" or "sacrificial" layer on the infrared reflective metal layer. This concerns a layer of very low thickness, whose function is to prevent any possible deterioration of the infrared reflective metal layer in particular when the upper layers are being deposited.

The barrier layer is carefully selected both for its nature and for its thickness. To prevent it from substantially reducing the light transmission, it is important to ensure that the barrier layer is as thin as possible, while also being highly transparent at the end of the production process of the multilayer stack.

Traditional systems therefore have the following layer sequence:

glass/dielectric I/metal/barrier/dielectric II

The metal layers, as indicated above, are those that selectively reflect infrared rays and therefore determine the emissivity of the assembly. While different metals are designated in specialist literature, practically all existing products use layers based on silver as reflective metal, and the silver can contain "doping" elements. In fact, it represents the best compromise in terms of infrared reflection and transparency to radiations in visible wavelengths and neutrality in colour in transmission and reflection. To simplify matters, the metal layer will be systematically presented as a silver layer hereafter.

Different means have been proposed to ensure that these silver layers attain the best performance rates. The instruction of the US publication 5 110 662 belonging to the applicant can be noted in particular, wherein the decisive influence of a ZnOy layer arranged directly below the silver layer and having a well defined thickness is demonstrated. It must be emphasised that variants of this idea have been used in several subsequent patents or patent applications such as WO 99/00528.

Various hypotheses have been projected to explain the mechanism that causes this ZnOy layer to improve the emissivity and conductivity properties under certain conditions. Some of these hypotheses concern, for example, the silver "hooking" onto the dielectric layer, while others consider that the presence of ZnOy benefits the crystallisation of the silver in systems resulting in fewer particle boundaries etc.

The conductivity and consequently the emissivity of the silver layers deposited in industrial conditions have been appreciably improved over time without reaching the ideal values of metallic silver. The choice is naturally to use layers that have the best conductivity and therefore the best emissivity possible. In the absence of having perfect silver layers available, it would appear that an additional improvement in emissivity could only be obtained by increasing the thickness of the silver layer.

It is well known that emissivity decreases when the thickness of the silver increases. Nevertheless, the consequences of this increase in the thickness of the silver are not all favourable. While the light transmission is affected relatively little, within the usual limits of variations in thickness of the silver layer, the main difficulty lies in the significant deterioration in resulting colorations in particular in reflection. The glazings in question tend to lose their neutrality.

For this reason in particular, the inventors have endeavoured to further improve the layer systems to obtain glazings, wherein the emissivity is also reduced while preserving the light transmission and an acceptable colour as far as possible.

SUMMARY

The inventors have demonstrated that this improvement could come from the choice of the nature of the barrier layer and its mode of production.

According to the invention the barrier layer used is formed from a layer of titanium oxide or sub-oxide deposited using conductive titanium oxide cathodes.

The use of barrier layers of titanium oxide is traditional. This oxide has the advantage of high stability and because of its high refractive index, it minimises the loss of light transmission resulting from the presence of this barrier layer. It is traditionally deposited using metal targets and most frequently in an atmosphere practically depleted of oxygen except for residual traces after elimination of the ambient air.

The formation of a layer that is as transparent as possible requires a practically stoichiometric oxide. Working from a metal target, it is necessary to oxidise the metal either at the time of deposition or thereafter. Oxidation resulting from the reaction of the metal firstly deposited by reaction with the oxidising atmosphere prevailing in the enclosure during subsequent deposits of the upper dielectric layers is not generally sufficient, even if the thickness of the barrier layer is very slight. There generally results a weakening of the light transmission that can be in the order of 1 to 2% and a deterioration in emissivity.

Moreover, the use of conductive titanium oxide targets has been proposed previously to produce dielectric layers with "de-reflective" optical properties in layer stacks. This application aims to be a substitute for techniques involving deposition in essentially "reactive" conditions. In fact, the most usual deposit is obtained using metallic titanium targets in an oxidising atmosphere. The difficulty with this traditional technique comes from the formation of an insulating oxide on the target that results in very slow deposition rates.

The use of so-called "ceramic" oxide targets allows this limitation to be partially overcome, nevertheless with the provision of specific measures. In particular it is necessary to use an adequately conductive oxide. Stoichiometric oxide is practically non-conductive and the main objective of the previous proposals in this regard have been to obtain conductive cathodes. This is the case in particular in the publication EP 0 852 266, which proposes to use sub-stoichiometric oxides, in particular of the type TiOx. The oxide in powdered form is compacted and reduced to give it the required conductivity. This publication envisages the use of these targets to form layers with a high-index optical property.

In general, the relatively recent development of means such as pulsed systems that enable the rate of deposition using metal targets to be substantially accelerated has caused the use of ceramic targets to remain relatively modest.

From experience the inventors have shown that for the production of barrier layers the use of ceramic targets more readily allows conditions to be provided that are beneficial to the quality of the silver layer. Sputtering using a titanium oxide results in a layer, in which the oxidation is better controlled. The barrier layer obtained can be much closer to the stoichiometry without having to modify the silver layer. In this way, it is possible both to reduce the loss of light transmission resulting from this barrier layer and to improve the low-emissivity property of the silver layer with the same quantity of silver deposited. Conversely, with the same efficacy as infrared filter, this result allows the quantity of silver deposited to be reduced and consequently the light transmission to be additionally improved, and above all allows better control of the colorations in reflection of the glazing units obtained.

The barrier layer according to the invention preferably has as low a thickness as possible to limit the light absorption while readily protecting the underlying silver layer. In practice, this layer is not less than 1 nm.

It is preferred to maintain the thickness at less than 6 nm, and more preferred less than 5 nm.

It is possible to have a titanium oxide layer with a thickness greater than that strictly necessary to fulfil the barrier function. In this case, the titanium oxide layer simultaneously has the function of a dielectric that assists in the optical properties of the assembly as "de-reflective". In this function the titanium oxide layer is of interest because of its high refractive index, which allows the thickness to be limited while maintaining a defined optical path. In this concept, the layer can be as much as or even exceed 10 nm.

To come as close as possible to the stoichiometry when the conductive cathode is made of a sub-stoichiometric oxide, the titanium oxide barrier layer is deposited in a lightly oxidising atmosphere to compensate in particular the oxygen deficit in the material of the cathode used. The oxidising atmosphere is advantageously composed of a mixture of inert gas and an oxidising gas.

Various factors are involved in controlling the reaction: the proportion of each of the constituents of the gaseous mixture, their nature and additionally the total pressure, the gaseous fluxes, the electric power involved, the configuration of the installation etc. With the pressures usually employed in industrial installations, which are in the order of 2 to $10.10^{-6}$ Torr and preferably 3 to $6.10^{-6}$ Torr, the mixture usually comprises at most 20% of oxidising gas, more frequently at most 10%, and preferably less than 5%, in the power conditions usually applied.

The oxidising agent can be formed from oxygen. Carbon dioxide has also proved to be an oxidising agent that allows good control of the reaction. If need be, carbon monoxide can also serve as oxidising agent. Nitrogen oxides are also usable oxidising gases.

The inert gas most usually used in plasma deposition plants is argon, but other inert gases can also be used either alone or in mixture.

The quantity of oxidising gas is dependent on the mode of operation of the cathode. It is a matter of coming to a compromise between the deposition rate, on the one hand, and full control of the oxidation reaction, on the other. With a very low quantity of oxidising agent, the cathode operates in a so-called "metallic" mode. Although it concerns a titanium oxide cathode, by analogy the terminology is that usually used for "reactive" modes with metal cathodes. The deposition rate can be high, but the reaction is controlled less easily. If the content of oxidising agent is slightly higher, the reaction at the cathode can lead to a saturation, which inappropriately limits the deposition capacity. Still by analogy, this mode is thus termed "oxide". However, this mode does not enable maintenance of the quality of the silver to be assured. For this reason, the quantity of oxidising agent must remain limited.

The choice of proportions of the mixture allows an operation to be put in place that combines the stability and an adequate deposition rate over a sufficiently broad volume/power ratio range to be easily controlled in industrial installations.

The conductive titanium oxide cathodes are advantageously formed from sub-stoichiometric compounds as disclosed, for example, in the cited patent EP 852 266. The oxygen deficiency in these oxides is preferably limited to that necessary for the cathodes to be sufficiently conductive and allow an adequate deposition rate. The degree of sub-oxidation is preferably such that the oxide complies with the formula $TiO_x$, where $1.5<x<1.95$ and preferably even $1.7<x<1.9$.

The titanium oxide cathodes can also contain doping agents, in particular those capable of benefiting conduction. Examples of doping agents are aluminium or silicon.

The conditions for forming barrier layers according to the invention allow the properties of the silver layer to be favourably retained and the light absorption associated with the barrier itself to be minimised. The light absorption by the barrier layer is less than 1% in all cases. It usually remains below 0.5% and in the preferred conditions is less than 0.3%.

When the titanium oxide layer is simultaneously used as barrier layer and as "optical" layer, and when the thickness is therefore greater than 5 nm or even greater than 6 nm, it is particularly desirable to limit the light absorption of the layer that increases with this thickness. Deposition can be conducted in different conditions depending on whether the fraction of the layer is directly in contact with the silver layer or whether the fraction is further away from this silver layer. This latter fraction is advantageously fully stoichiometric to be practically devoid of light absorption. As indicated above, the portion in contact with the silver must firstly safeguard the silver layer against any deterioration and therefore this portion cannot be perfectly stoichiometric.

The use of a layer, the nature of which is adapted as a function of its thickness, requires particular measures, e.g. in the circulation of the gaseous fluxes and in the arrangement of the titanium oxide cathode or cathodes in one or more installation zones, wherein each zone customarily corresponds to defined conditions of deposition, in particular atmosphere conditions. Depending on the manufacturers of these installation, the zones each comprise one or a plurality of cathodes.

In practice, for example, when the titanium oxide layer has only one barrier function, deposition being conducted in very lightly oxidising conditions, it is possible to combine the silver cathode and the titanium oxide cathode in the same zone of the installation. In the case of a very thick deposit of titanium oxide in order to accentuate the oxidising character of the deposition conditions at least over a portion of the layer, deposition can be conducted using a plurality of successive titanium oxide cathodes operating in different conditions, in particular with respect to the atmosphere. In this case, the successive titanium oxide cathodes can be located in separate zones with one cathode in the same zone as the silver cathode, the other cathode or cathodes in a zone downstream, or even with these titanium oxide cathodes all in one or a plurality of zones downstream of the zone containing the silver cathode.

Whether the layer acts solely as barrier or it also has an optical function, it is preferred to conduct deposition on the basis of a single cathode. When the layer is relatively thick (in the order of tens of nanometers) and this layer is deposited using a single cathode, it would be advantageous to be able to form a layer that is as transparent as possible in order to limit absorption, and therefore completely oxidise the layer. However, to do this would pose the risk of causing deterioration of the silver layer. Consequently, the choice of a single cathode additionally leads to the deposition of an oxide that is not perfectly stoichiometric. However, the use of a layer with a high refractive index and the limitation of thickness that generates this index are more than sufficient to maintain the total absorption at very low levels.

As indicated above, most advantageously low-emissivity glazings according to the invention additionally comprise a zinc oxide layer below the silver layer and in direct contact therewith. The layer system therefore has the following structure:

glass/dielectric I/$ZnO_y$/Ag/$TiO_z$/dielectric II wherein $TiO_z$ represents the possibly slightly sub-stoichiometric barrier.

The zinc oxide, $ZnO_y$, is itself stoichiometric or slightly sub-stoichiometric. The zinc layer whose function, as indicated previously, is to improve the characteristics of the silver layer advantageously has a relatively limited thickness. It is preferably 3 to 10 nm and particularly preferred 4 to 8 nm. A more substantial thickness will not provide any additional improvement of the silver layer. Too substantial a thickness may even impair these properties as a result of a possible change in structure of the silver layer that may accompany this increase in thickness. In fact, it has been found that above a certain thickness zinc oxide has a tendency to grow in "columnar" form, which obviously provides a less uniform support for the silver layer.

The regulations relating to insulating glazings require increasingly restrictive performance rates with respect to emissivity. As an indication, in the case of a glazing formed from two glass sheets and a space between these sheets filled with insulating gas, the current requirement is to obtain a coefficient U at least equal to 1.1 $W/m^2.K$. These values for an insulating gas containing at least 85% argon require an emissivity in the order of 0.038 or less. Usual practice is to provide a layer assembly on one of the two glass sheets, wherein this assembly preferably only comprises one silver layer.

Since users simultaneously demand a high light transmission and neutrality of colour in reflection, the silver layers and also the dielectric layers are enclosed within extremely precise limits.

DETAILED DESCRIPTION

As indicated above, the silver layer is the first to determine emissivity. To attain the necessary values, this layer even when optimised by using a barrier according to the invention must have a certain thickness. Depending on the applications of the glazing units, the quantity of silver per unit area used lies between 80 and 150 $mg/m^2$. For applications strictly of insulating glazing, the quantity of silver lies between 100 and 140 $mg/m^2$.

In the conditions of the invention with the quantities of silver indicated above, the glazing units advantageously provide an emissivity that does not exceed 0.04, preferably does not exceed 0.038. In better arrangements the glazing units according to the invention have an emissivity that remains less than or equal to 0.035.

Remarkably, the emissivity values indicated above are obtained with quantities of silver that remain less than those usually considered to be necessary to achieve these performances. One way of expressing this ability is to measure the product of the quantity of silver per unit area and the resistance expressed in $\Omega\square$. The assembly is considered to be all the better, the lower this product is. As an indication, according to the invention for quantities of 135 $mg/m^2$ the product is at most equal to 440 and even at most equal to 410 and can be as low as 370. In other words, the silver layer used in the conditions of the invention has a conductivity, and therefore an emissivity, that is particularly favourable.

With the figures indicated above, it is necessary to refer to a specific apparatus for measuring resistances. Experience shows that values differ substantially depending on the apparatus used. The apparatus used is a "Stratometer 500" from Nagy.

This result allows either the performances for a given quantity of silver to be improved or the quantity of silver necessary to achieve the required performance to be minimised.

The quantities of silver per unit area relate to the assumed sole silver layer. It is possible to replace this layer with two distinct layers separated by one or more dielectric layers. In practice, the division of the silver layer by multiplying the interfaces is not the most efficient solution to obtain the best emissivity. It may be necessary for the same emissivity to slightly increase the total thickness. The solution comprising the use of two silver layers instead of one opens up different possibilities with respect to the adjustment of interferential systems with dielectric layers in order to improve the neutrality of colour in particular in reflection. Where control of the neutrality of coloration can be achieved without dividing the silver layer, this solution is preferred since it allows a very high light transmission and a better selectivity to be assured.

The most satisfactory emissivity values can be reached without impairing the light transmission. In the case of a 4 mm thick clear "float" glass sheet, in which the actual transmission is 90%, the light transmission is advantageously established at values, which are not less than 83% and advantageously not less than 84% and can reach or exceed 86%, with a layer system according to the invention.

The values indicating light transmission given above are those of systems deposited on ordinary clear glasses. Higher values are possible when the deposits are made on so-called "extra clear" glasses. Therefore, it is possible to increase the transmission from 1 to 2% and for clearer glasses 2.5%.

To achieve these transmission values, it is necessary to limit the reflection in the visible by appropriate selection of the "de-reflective" layers located above and below the silver layer apart from the barrier and ZnOy layers already specified. At the same time, the choice of these layers, their nature and thickness must enable the glazing units to be maintained in conditions of neutrality of colours demanded by users, in particular neutrality in reflection. Using the CIELab calorimetric coordinates, this corresponds to values a* and b* close to zero. Negative values, in particular for b*, are also acceptable. They provide the glazing either with a blue hue in the case of negative values of b* or a green hue in the case of negative values of a*. Conversely, the aim should be to avoid positive values of a*, which would lead to purple and brownish hues.

The neutrality of glazings is dependent on the choice of the combinations of layers. The layers forming the assemblies in question are involved in forming an interferential system which allows the major portion of undesirable wavelengths to be eliminated. The elimination of these colours is based on a well known mechanism in this field. The difficulty is to simultaneously combine the colorimetric requirements with those associated with the "basic" conditions: high light transmission and very low emissivity.

The interferential systems that allow the colour in reflection to be "neutralised" result in at least one layer with a relatively high refractive index under the silver layer, apart from the zinc oxide layer concerned in the above, and layers with a lower refractive index above the barrier layer located on the silver layer.

Not only must the choice of dielectric layers correspond to the index conditions enabling the reflection in the visible to be reduced as far as possible without impairing the neutrality, whether in reflection or in reflection, this choice of layers must also result in as low an absorption as possible. These layers must also be perfectly compatible with the layers that they are in contact with, and above all must be relatively simple and economical to produce industrially in traditional installations.

The optical filter formed by the silver layer and the assembly of dielectric layers requires a certain optical path, in other words a certain value of geometric thickness (e) of each layer multiplied by the index (n) of this layer (e×n). In the case of the silver thicknesses considered according to the invention, the optical paths of the assembly of layers respectively located below and above the silver are 50 to 90 nm below and 70 to 110 nm above. These optical paths that enable neutrality both in reflection and in transmission to be achieved are preferably 55 to 80 nm below the silver and 75 to 100 nm above the silver.

The dielectrics located below the silver apart from the ZnOy layer are advantageously layers of titanium, zirconium oxide or nitrides or oxynitrides, layers of bismuth or alloys of titanium and aluminium or silicon. Titanium oxide is advantageous because of its high refractive index and its high transparency.

Titanium oxide can be deposited using cathodes of conductive oxide, as explained above with respect to the barrier layer. The titanium oxide layers obtained in this manner, even if they have an oxygen deficit that causes a certain light absorption, remain effective because of their very low thickness that compensates this slight absorption.

The titanium oxide obtained has a refractive index for a wavelength of 550 nm that is not usually higher than 2.6, and most frequently amounts to between 2.30 and 2.5 depending of the deposition conditions, and the highest indexes are obtained with also the highest deposition rates.

The refractive indexes of other layers are: in the case of zinc oxide, even containing a low proportion of aluminium, in the order of 1.9 to 2; that of zirconium oxide is close to 2.1 to 2.2. In the case of mixed oxides based on titanium and another metal, the index is dependent on the proportion in which the latter is contained in the alloy. The preferred alloys have an index in the range of between 2.1 and 2.3 corresponding in the case of an alloy based on titanium and aluminium, for example, to percentages of aluminium that can be as much as 50% aluminium, and preferably range between 10 and 30% by weight in the target, this proportion remaining approximately the same in the deposited layer.

The interferential system can naturally contain several distinct layers below the silver. A preferred system is formed from:

glass/TiOw/ZnOy/Ag/TiOz/ . . .

in which TiOw represents a titanium oxide or sub-oxide not necessarily identical to that of the barrier layer indicated above as TiOz.

In order to form a satisfactory interferential filter, the dielectrics located above the barrier layer traditionally form an assembly that, in addition to the properties leading to formation of the interferential filter, provide appropriate protection for the silver layer both from the chemical and mechanical viewpoint.

For their ease of deposition in association with a favourable light transmission, preferred dielectric layers located above the silver are based on oxides of zinc, tin, indium, mixtures of these oxides or nitrides or even oxynitrides such as those of silicon or aluminium as well as mixtures thereof.

It is usual to combine several layers of different types, if need be, to take into account the special features of each. Thus, zinc oxide widely used because of its relatively simple formation has the disadvantage of providing a low chemical resistance because of the "columnar" structure that it tends to develop when its thickness is sufficient. This columnar growth facilitates the penetration of moisture and chemical agents inside the layer in the direction of the silver layer.

For this reason, while the use of a zinc layer is usual, this is generally associated with a substantially more "compact" layer to impede chemical agents. A tin oxide-based or indium oxide-based layer, possibly doped, or also a silicon nitride layer is advantageously inserted into the layer system located above the silver.

A particularly advantageous combination is formed by the following assembly located above the silver:

glass/ . . . /Ag/TiOz/ZnO/$SnO_2$ . . .

Another advantageous combination according to the invention comprises the following sequence above the silver layer:

glass/ . . . /Ag/TiOz/$Si_3N_4$ . . .

The layer system of glazings according to the invention can also be provided with a surface layer selected particularly for the purpose of a high mechanical resistance. Titanium oxide layers have previously been proposed for this purpose. They can be used as part of the glazings according to the invention. However, the high index of titanium oxide layers means that they are preferably replaced by other layers, in particular silicon oxide layers, which in addition to their hardness have a very low index that contributes to the configuration of the appropriate interferential system.

Since the hard surface layer has a role of mechanical protection, its thickness is limited to what has proved effective in this field. The thickness will not generally be more than 15 nm. If silicon oxide is chosen, the difficulty of producing this type of layer means that a thickness of 12 nm should preferably not be exceeded.

To meet the requirements of users, it is not only necessary to improve the emissivity while maintaining the light transmission, but the glazings according to the invention must remain neutral in particular in reflection.

A glass sheet according to the invention comprises an assembly of layers such as indicated above, wherein the respective thicknesses of silver and the dielectrics are selected so that the values of the CIELab colorimetric coordinates in the case of illuminant D65 amount in reflection to:

$-4<a^*<3$ and $-17<b^*<-5$ and preferably to:

$-3<a^*<2$ and $-13<b^*<-8$.

In transmission the favourable rendering of colours is essential. For this reason, a stricter neutrality is necessary. The thicknesses of the silver and the dielectrics are preferably chosen so that the calorimetric coordinates in the CIELab system in transmission amount to:

$-4<a^*<0$ and $b^*<4$ and preferably:

$-3<a^*<0$ and $b^*<3$.

The important point with respect to the transmitted light is to not have a pronounced yellow coloration, in other words that b* is not too positive.

The invention also relates to double glazing units formed by means of two glass sheets, wherein one bears the assembly of layers indicated above. In these double glazing units, the layers are advantageously arranged in a position directed towards the space between the two sheets, and more particularly in position 3 according to the traditional designation, i.e. on the glass sheet in contact with the internal atmosphere and on the face thereof on the inside of the double glazing. The double glazing units according to the invention advantageously meet the conditions of neutrality obtained as above by adjusting the thicknesses of the layers within the limits indicated with respect to the characteristics of emissivity and light transmission, so that the calorimetric coordinates in external reflection in the CIELab system amount to:

$-3<a^*<1$ and $-8<b^*<0$ and preferably:

$-2<a^*<0$ and $-7<b^*<-2$

By the choice of the nature and the thickness of the dielectric layers located below and above the silver, the double glazing units according to the invention, in the case of two 4 mm thick clear float glass sheets wherein the transmission without layer amounts to 82%, also advantageously have a light transmission that is not less than 73% and preferably not less than 75%. The transmission for these double glazing units can be advantageously higher than 76% and can rise to more than 78% in the case of the least significant quantities of silver in the margins indicated above. As indicated above, these values can be increased by using "extra clear" glasses.

To illustrate the advantages obtained by implementing the invention systems of layers are deposited on 4 mm thick clear glass sheets with an actual transmission of 90%.

A layer of titanium oxide TiOw is deposited on these glasses using ceramic cathodes. The titanium oxide layer is 20 nm. A 4 mm thick layer of ZnOy is then deposited by reactive deposition using a zinc cathode. A silver layer deposited in an argon atmosphere is applied to the zinc layer.

On this common base, a barrier layer is deposited in accordance with the different modes indicated below. The assembly is covered with a layer of ZnO followed by a layer of $SnO_2$, the two layers amounting to a thickness of 47 nm. The complete sequence is therefore:

glass/TiOw/ZnOy/Ag/barrier/ZnO/$SnO_2$

The deposition of the barrier layer is firstly achieved using a metal titanium target in an argon atmosphere. The barrier layer is 2.5 nm. In this case the silver layer amounts to 135 mg/$m^2$.

The properties of this glazing in the form of double glazing insulating the layer system applied in position 3 result in the following properties:

| | |
|---|---|
| LT | 74.7 |
| ε | 0.038 |
| quality | 445 | a* −0.1
b* −6.9

Onto the same assembly the barrier layer according to the invention is deposited using a TiOx ceramic cathode (x is 1.82), in an argon/oxygen atmosphere with 1% oxygen. The barrier layer has a thickness of 3.5 nm. The silver layer amounts to 131 mg/$m^2$. Therefore, the properties are:

| | |
|---|---|
| LT | 76.2 |
| ε | 0.037 |
| quality | 420 | a* −0.1
b* −5.7

In the conditions of the invention, a reduction in emissivity and an increase in transmission are observed, although the quantity of silver is lower than that in the above reference example and the barrier layer is a little thicker.

Still on the same assembly, the barrier is deposited using the above TiOx cathode in an argon/carbon dioxide atmosphere with 2% carbon dioxide. The barrier layer has a thickness of 3 nm. The silver layer amounts to 126 mg/m². The properties are:

| LT | 76.9 |
|---|---|
| ε | 0.034 |
| quality | 375 | a* −0.3
b* −6

The emissivity and the light transmission are even better than above and this is in conjunction with a lower quantity of silver.

The invention claimed is:

1. Low-emissivity glazing comprising, on a sheet of glass, an assembly of thin layers formed by magnetron-assisted vacuum deposition, wherein said assembly comprises at least one metal layer reflecting infrared rays arranged between one or more dielectric layers located between the metal layer and the glass sheet, on one side, and on the metal layer, on the other side, wherein the metal layer is covered with a protective barrier layer formed by a layer of titanium oxide or sub-oxide deposited in a weakly oxidising atmosphere at reduced pressure using a conductive titanium oxide cathode.

2. Glazing according to claim 1, wherein the conductive titanium oxide cathode is formed from a TiOx oxide with $1.5<x<1.95$.

3. Glazing according to claim 1, wherein the light absorption of the barrier itself is less than 1%.

4. Glazing according to claim 1, wherein the weakly oxidising atmosphere is formed by a mixture of inert gas and oxidising gas.

5. Glazing according to claim 4, wherein the barrier layer is deposited in an atmosphere comprising a mixture of an inert gas and carbon dioxide.

6. Glazing according to claim 5, wherein the content of carbon dioxide in the atmosphere is at most equal to 25%.

7. Glazing according to claim 1, wherein the barrier layer has a thickness of at least 1 nm.

8. Glazing according to claim 1, wherein the barrier layer has a thickness that is not more than 6 nm.

9. Glazing according to claim 1, wherein the metal layer is a silver layer uniformly applied at a rate of 80 to 150 mg/m².

10. Glazing according to claim 9, wherein the barrier layer is deposited on a metallic silver layer uniformly applied at a rate of 100 to 140 mg/m².

11. Glazing according to claim 1, wherein the metal layer is deposited on a layer of zinc oxide or sub-oxide having a thickness in the range of between 3 and 10 nm.

12. Glazing according to claim 1, wherein the emissivity is at most equal to 0.04.

13. Glazing according to claim 1, wherein the metal layer is a silver layer of at most 135 mg/m², wherein the product of this value by that of the resistance expressed in ohm square is at most equal to 420.

14. Glazing according to claim 1, wherein in the case of a 4 mm thick clear "float" glass sheet with an actual transmission equal to 90%, the transmission of the sheet covered by these layers has a light transmission at least equal to 83%.

15. Glazing according to claim 9, wherein the nature and thicknesses of the layers of dielectrics are selected so that the optical path of the assembly of layers located below the silver layer is 50 to 90 nm, and that of the layers located above the silver layer is 70 to 110 nm.

16. Glazing according to claim 15, wherein the optical path of the assembly of layers located below the silver layer is 55 to 80 nm, and that of the layers located above the silver layer is 75 to 100 nm.

17. Glazing according to claim 16, wherein the nature and thicknesses of the layers of dielectrics are selected so that the colour in reflection expressed in CIELab coordinates are such that: $-4<a^*\leq 3$ and $-17<b^*\leq -5$.

18. Glazing according to claim 17, wherein the nature and thicknesses of the layers of dielectrics are selected so that the colour in reflection is: $-3<a^*\leq 2$ and $-13<b^*\leq -8$.

19. Glazing comprising two glass sheets, one of which is formed according to claim 1, wherein the space arranged between the two glass sheets encloses an atmosphere formed from at least 85% argon.

20. Glazing according to claim 1, wherein the conductive titanium oxide cathode is formed from a TiOx oxide with $1.7<x<1.9$.

21. Glazing according to claim 1, wherein the light absorption of the barrier itself is less than 0.5%.

22. Glazing according to claim 1, wherein the barrier layer has a thickness that is not more than 5 nm.

23. Glazing according to claim 1, wherein the emissivity is at most equal to 0.038.

24. Glazing according to claim 1, wherein the metal layer is a silver layer of at most 135 mg/m², wherein the product of this value by that of the resistance expressed in ohm square is at most equal to 410.

25. Glazing according to claim 1, wherein in the case of a 4 mm thick clear "float" glass sheet with an actual transmission equal to 90%, the transmission of the sheet covered by these layers has a light transmission higher than 84%.

26. A method of forming a low-emissivity glazing comprising, on a sheet of glass, an assembly of thin layers formed by magnetron-assisted vacuum deposition, wherein said assembly comprises at least one metal layer reflecting infrared rays arranged between one or more dielectric layers located between the metal layer and the glass sheet, on one side, and on the metal layer, on the other side, wherein the metal layer is covered with a protective barrier layer, which method comprises depositing the protective barrier layer as a layer of titanium oxide or sub-oxide in a weakly oxidising atmosphere at reduced pressure using a conductive titanium oxide cathode.

27. Glazing according to claim 1, wherein the weakly oxidising atmosphere comprises at most 20% of oxidizing gas and the reduced pressure is of the order $2\times 10^6$ to $10\times 10^6$ Torr.

28. Glazing according to claim 27, wherein the weakly oxidising atmosphere comprises at most 20% of oxidizing gas and the reduced pressure is of the order $3\times 10^6$ to $6\times 10^6$ Torr.

29. Glazing according to claim 27, wherein the weakly oxidising atmosphere comprises at most 10% of oxidizing gas and the reduced pressure is of the order $2\times 10^6$ to $10\times 10^6$ Torr.

30. Glazing according to claim 27, wherein the weakly oxidising atmosphere comprises at most 5% of oxidizing gas and the reduced pressure is of the order $2\times 10^6$ to $10\times 10^6$ Torr.

* * * * *